United States Patent [19]

Ogura

[11] Patent Number: 5,347,316
[45] Date of Patent: Sep. 13, 1994

[54] IMAGE INFORMATION TRANSMISSION SYSTEM HAVING TIME BASE VARIATION CORRECTING FUNCTION

[75] Inventor: Tokihiko Ogura, Kanagawa, Japan

[73] Assignee: Canon Kabushiki Kaisha, Tokyo, Japan

[21] Appl. No.: 173,703

[22] Filed: Dec. 23, 1993

Related U.S. Application Data

[63] Continuation of Ser. No. 793,610, Nov. 18, 1991, abandoned.

[51] Int. Cl.$^5$ .............................................. H04N 5/95
[52] U.S. Cl. .................................. 348/497; 348/538; 358/339
[58] Field of Search ............... 348/571, 441, 469, 723, 348/478, 497, 538; 358/335, 339, 310, 337, 320, 323

[56] References Cited

U.S. PATENT DOCUMENTS

| | | | |
|---|---|---|---|
| 4,956,707 | 9/1990 | Oakley | 358/140 |
| 5,062,005 | 10/1991 | Kitaura | 358/310 |
| 5,072,315 | 12/1991 | Tsunashima | 358/339 |

FOREIGN PATENT DOCUMENTS 1147990  6/1989  Japan.

*Primary Examiner*—James J. Groody
*Assistant Examiner*—Sherrie Hsia
*Attorney, Agent, or Firm*—Robin, Blecker, Daley & Driscoll

[57] ABSTRACT

An image information transmission system of the kind receiving a transmitted analog image signal and forming digital image data by sampling the received analog image signal is arranged to control the timing of sampling according to the level of data of a specific part of the digital image data formed. The arrangement enables the system to accurately transmit the image information without being affected by time base variations caused by transmission.

6 Claims, 6 Drawing Sheets

SWITCH c → ON

SWITCH b → ON

SWITCH a → ON

1

IMAGE INFORMATION TRANSMISSION SYSTEM HAVING TIME BASE VARIATION CORRECTING FUNCTION

This is a continuation application under 37 CFR 1.62 of prior application Ser. No. 07/793,610, filed Nov. 18, 1991, now abandoned.

BACKGROUND OF THE INVENTION

1. Field of the Invention

This invention relates to an image information transmission system which transmits image information.

2. Description of the Related Art

The image information transmission systems which have been known include an electronic still video system. The electronic still video system is arranged to record a still image signal, for example, on a magnetic disc which is employed as a recording medium and to reproduce the recorded still image signal from the magnetic disc.

The conventional electronic still video system has been arranged in conformity to a current TV system, such as the NTSC system or the PAL system, and is, therefore, hardly capable of recording or reproducing an image with a high degree of resolution. To solve this problem, a system called a compatible high-definition still video (abbreviated to CHSV) system has been proposed. The CHSV system is arranged, for example, to be capable of recording and reproducing an image signal with the resolution of about 1000 picture elements in the vertical direction and about 1300 picture elements in the horizontal direction for conformity with a high-definition TV system, such as a TV system called a high-vision system.

According to the CHSV system, an image is offset-sampled by means of an image sensor which has, for example, 1000 picture elements in the vertical direction and 1300 picture elements in the horizontal direction. Then, one field amount of an image signal thus obtained by the offset sampling is recorded in one track on the magnetic disc in such a way as to record one picture amount of a high-definition image signal in a total of four tracks.

At the time of reproduction, the high-definition image signal recorded on the magnetic disc is serially reproduced from the tracks one by one. A reproduced signal thus obtained is re-sampled in the same sampling position as the offset sampling performed in recording. Sampling data thus obtained by the re-sampling is reconstructed by temporarily storing the data in an image memory. Then, sampling data that has not been recorded on the magnetic disc is supplemented on the image memory by an interpolation process. In this manner, a high-definition image signal can be recorded and reproduced with the same degree of quality as the high-vision system.

FIG. 1 of the accompanying drawings shows some of effective picture elements included in the image sensing plane on the image sensor. In FIG. 1, marks "O" indicate the picture elements which are to be read out by the offset sampling. Marks "X" indicate the picture elements which are not read out by the offset sampling. Further, in FIG. 1, reference symbols An to Dn denote the respective fields corresponding to the picture elements.

FIG. 2 shows the pattern of tracks formed on the magnetic disc. The signals of four fields An to Dn shown in FIG. 1 are recorded respectively in a form conforming to the format of the electronic still video system. Further, in FIG. 2, a symbol H-SYNC denotes the position of a horizontal synchronizing signal. At the time of reproduction, the signals are reproduced from the magnetic disc. The reproduced signals corresponding to the picture elements marked "O" in FIG. 1 are re-sampled and temporarily stored in an image memory. Then, an interpolation process is carried out on the image memory for the signals corresponding to the picture elements marked "X" in FIG. 1 by using the signals corresponding to the picture elements marked "O".

FIG. 3 shows the amplitude characteristic of the CHSV system. As shown, the amplitude characteristic becomes a point symmetric roll-off characteristic at a Nyquist frequency fNY (fNY represents a frequency which is ½ of a sampling frequency fs used at the image sensor shown in FIG. 1). Further, the phase characteristic in the CHSV system must be flat.

Therefore, in the CHSV system, in order to permit making a check for the amplitude and phase characteristics of a transmission path (i.e., a recording/reproduction electromagnetic conversion system) and to obtain a phase reference for sampling, either one vertical interval test (hereinafter referred to as VIT) pulse or one horizontal interval test (hereinafter referred to as HIT) pulse is added to the image signal per vertical blanking period or horizontal blanking period of each field in recording. Further, a pilot signal is multiplexed in recording the image signal on the magnetic disc for a time base variation correcting process (TBC) which is to be performed on the reproduction side of the system.

Incidentally, the width of the VIT pulse or the HIT pulse is 2T (T: 1/fs).

FIG. 4 shows in outline the arrangement of a reproducting apparatus included in the CHSV system. The illustration includes a magnetic disc 51; a motor 52 which is arranged to rotate the magnetic disc 51; a magnetic head 53; a head moving mechanism 54 for moving the magnetic head 53 to an arbitrary position on the magnetic disc 51; a reproduction amplifier 55; a reproduced signal processing circuit 56; a transmission path correction circuit 57 which is arranged to correct changes in signal waveform due to the characteristic of a transmission path; an A/D (analog-to-digital) converter 58; a phase-locked loop (PLL) circuit 59 arranged to generate a sampling clock signal 2fs which has the same time base variations as the time base variations occurring in the image signal, on the basis of a pilot signal for the TBC which is multiplexed with the image signal in recording the image signal; an image memory 60; a system controller 61 which is arranged to control the image memory 60 and also to control the operation of the whole reproducing apparatus; a phase shifter 62 which is arranged to change the phase of the sampling clock signal 2fs generated by the PLL circuit 59 in such a way as to cause the peak of the VIT or HIT pulse to be sampled as will be described later with reference to FIG. 5; an interpolation process circuit 63; a D/A (digital-to-analog) converter 64; and an image signal output terminal 65.

The operation of the reproducing apparatus shown in FIG. 4 is described as follows:

Referring to FIG. 4, when an operation part which is not shown is operated to give an instruction for a reproducing action, for example, on a track "1" shown in FIG. 2, the head moving mechanism 54 moves the magnetic head 53 to the track 1 on the magnetic disc 51. The magnetic head 53 then reproduces a signal recorded in the track 1. The reproduced signal is amplified to a suitable level by the reproduction amplifier 55. The amplified signal is subjected to a frequency demodulation process, a deemphasizing process, etc., at the reproduced signal processing circuit 56. The signal thus processed is supplied to the transmission path correction circuit 57 to be subjected to an amplitude correction process, a phase correction process, etc. After these processes, the signal is supplied to the A/D converter 58.

Meanwhile the reproduced signal outputted from the reproduction amplifier 55 is supplied also to the PLL circuit 59. The PLL circuit 59 extracts a pilot signal for the TBC from the reproduced signal and generates a sampling clock signal 2fs which is phase-locked to the TBC pilot signal. The sampling clock signal 2fs generated by the PLL circuit 59 is supplied to the A/D converter 58 via the phase shifter 62. The A/D converter 58 then digitizes, in synchronism with the sampling clock signal 2fs, the reproduced image signal corrected by the above-stated transmission path correction circuit 57. The digitized image signal is stored in the image memory 60.

Of the sampling data thus stored in the image memory 60, data corresponding to the VIT or HIT pulse is read out by the system controller 61. The system controller 61 looks for the maximum value P0 of the data currently read out and the sample data P−1 and P+1 which are read out before and after the maximum value data P0, and causes the phase shifter 62 to shift the phase of the sampling clock signal 2fs generated by the PLL circuit 59, while causing the digitized data to be stored in the image memory repeatedly, until either a difference between the data P−1 and P+1 reaches a minimum value or the value of the data P0 reaches a maximum value.

When the phase control over the sampling clock signal 2fs is completed and the image signal reproduced from the track 1 shown in FIG. 2 is re-sampled and stored in the image memory 60, the system controller 61 causes the head moving mechanism 54 to move the magnetic head 53 to a track 2 shown in FIG. 2. With the head 53 thus moved to the track 2, the image signal recorded in the track 2 is thus reproduced. Then, in the same manner as described above, the reproduced image signal is re-sampled and stored in the image memory 60. After the track 2, image signals recorded in other tracks 3 and 4 are likewise resampled and stored in the image memory 60.

The image signal which is recorded in the four tracks on the magnetic disc 51 is thus completely resampled and stored in the image memory 60. After that, the interpolation process circuit 63 performs an interpolation process with the data which corresponds to the picture elements marked "O" in FIG. 1 (i.e., data reproduced from the magnetic disc 51 and re-sampled) for the data which corresponds to the picture elements marked "X" in FIG. 1.

After completion of the interpolation process, data stored in the image memory 60 is read out in accordance with an accurate clock signal which has no time base variations and is generated by a reading clock signal generator (not shown). The data thus read out is supplied to the D/A converter 64 to be converted into an analog signal. As a result, a high-definition image signal which is comparable with the so-called high-vision signal is outputted from the output terminal 65.

Further, FIG. 6 shows another arrangement of the reproducing apparatus of the CHSV system. In FIG. 6, the components which are similar to those of the reproducing apparatus of FIG. 4 are indicated by the same reference numerals and the details of them are omitted from the following description. In the case of the reproducing apparatus shown in FIG. 6, a signal reproduced from the magnetic disc 51 is demodulated into an image signal and is stored in the image memory 60. After that, data stored in the image memory 60 is waveform-equalized by an waveform equalizer 66. After the waveform equalizing process, the data is again stored in the image memory 60. The data stored again is supplied to the interpolation process circuit 63 to be subjected to an interpolation process. The interpolated data is supplied to a D/A converter 64 to be converted into an analog signal and is outputted as a high-definition image signal.

In the case of the reproducing apparatus of FIG. 6, the re-sampling clock signal is set at a frequency 2fs which is four times as high as the Nyquist frequency fNY. Therefore, no aliasing takes place in the neighborhood of the Nyquist frequency, so that the waveform equalizing process can be carried out with a high degree of accuracy. It is another advantage of the apparatus of FIG. 6 that the phase shifter of the reproducing apparatus shown in FIG. 4 can be omitted. However, the waveform equalizing process in a digital manner, like in the case of the reproducing apparatus of FIG. 6, has presented the following problems: in a case where a difference between the sample data P0 and the sample data P−1 or P+1 is small, i.e., in a case where the current phase of sampling points is greatly deviating from a normal phase of sampling points, as shown in FIG. 7, a digital filter used for the waveform equalizer 66 which is used for waveform equalization must be arranged to have many taps. The digital filter then tends to be affected by noises at signal parts before and after the VIT or HIT pulse. The equalizing accuracy thus would be greatly degraded by noises.

SUMMARY OF THE INVENTION

It is a general object of this invention to provide an image information transmission system which is capable of solving the above-stated problems.

It is a more specific object of the invention to provide an image information transmission system which is capable of accurately transmitting image information without being affected by time base variations caused by the transmission process in transmitting the image information.

Under this object, an image information transmission system arranged to transmit image information according to this invention as an embodiment thereof comprises digital image data forming means arranged to receive a transmitted analog image signal and to form digital image data by sampling the received analog image signal; and sampling timing delay-control means for delay-controlling a sampling timing of the digital image data forming means according to the level of data representing a specific part of the digital image data formed by the digital image data forming means.

It is another object of the invention to provide an image information transmission system which is capable of accurately and stably storing image information without being affected by any time base variations taking place on a transmission path.

Under that object, an image information transmission system arranged to transmit image information according to this invention as an embodiment thereof comprises conversion means arranged to receive a transmitted analog image signal, to convert the received analog image signal into digital image data in synchronism with a sampling clock signal and to output the digital image data; storing means for storing the digital image data outputted from the conversion means; and sampling clock signal delay means arranged to detect a difference value between data indicating the largest value among data of a specific part of the digital image data stored in the storing means and data indicating the second largest value among the data of the specific part, to compare the detected difference value with a given threshold value, to delay the sampling clock signal according to the result of comparison and to supply the delayed sampling clock signal to the conversion means.

It is a further object of the invention to provide an image information transmission system which is capable of accurately and stably removing time base variations taking place on a transmission path in transmitting the image information.

Under the above-stated object, an image information transmission system arranged to transmit image information according to this invention as an embodiment thereof comprises clock signal generation means for generating a clock signal; time base variation removing means arranged to receive a transmitted analog image signal and to remove time base variations occurring in the received analog image signal by using the clock signal outputted from the clock signal generation means; and clock signal delay-control means for delay-controlling the clock signal generated by the clock signal generation means according to the level of data obtained by digitizing a specific part of the analog image signal inputted to the time base variation removing means.

The above and other objects and features of the invention will become apparent from the following detailed description of an embodiment thereof taken in connection with the accompanying drawings.

DETAILED DESCRIPTION OF THE PREFERRED EMBODIMENT

Figure 8:
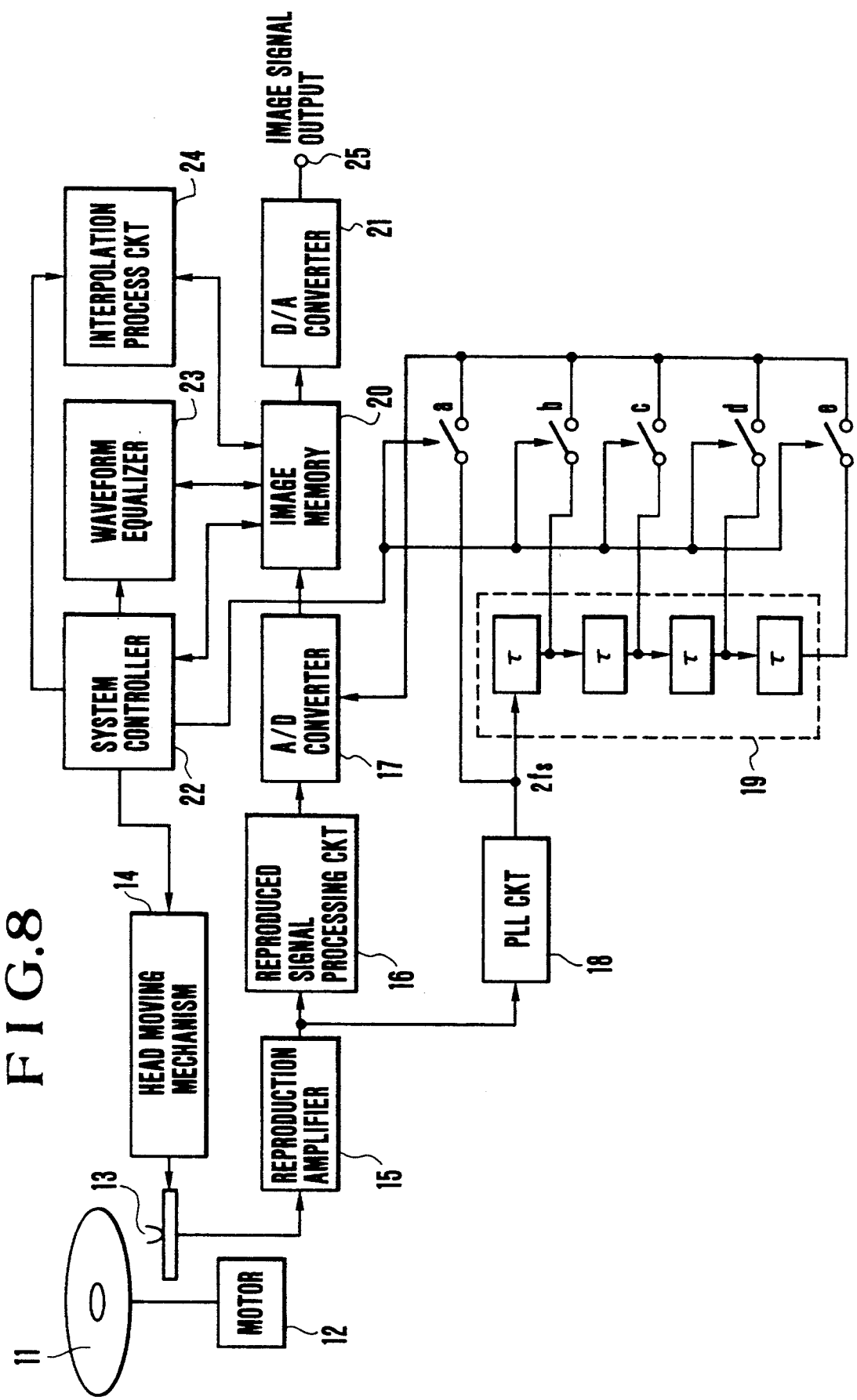
FIG. 8 is a block diagram showing in outline the arrangement of a reproducing apparatus included in a CHSV system which is arranged according to this invention as an embodiment thereof.

The following describes the details of this invention through a preferred embodiment thereof:

FIG. 8 is a block diagram showing in outline the arrangement of a reproducing apparatus included in a CHSV system to which this invention is applied. The illustration includes a magnetic disc 11; a motor 12 which is arranged to rotate the magnetic disc 11; a magnetic head 13; a head moving mechanism 14 which is arranged to move the magnetic head 13 to any arbitrary position on the magnetic disc 11; a reproduction amplifier 15; a reproduced signal processing circuit 16; an A/D converter 17; a PLL circuit 18 which is arranged to generate a sampling clock signal 2fs from a TBC pilot signal multiplexed with an image signal when the image signal was recorded, in such a way as to make the sampling clock signal have the same time base variations as any time base variations that have taken place in the image signal; a delay element group 19 for delaying the sampling clock signal 2fs outputted from the PLL circuit 18; an image memory 20; a D/A converter 21; a group of switches "a" to "e" for changing the amount of delay of the sampling clock signal 2fs by the delay element group 19 from one amount over to another; a system controller 22 which is arranged to take in, from the image memory 20, data corresponding to a VIT pulse, to control the group of switches "a" to "e" for change-over of the amount of delaying the sampling clock signal 2fs and to control the operation of the whole reproducing apparatus; a waveform equalizer 23 arranged to compare the data which is stored in the image memory 20 and corresponds to the VIT pulse with data which is assumed to correspond to the VIT pulse and obtained through an ideal transmission path, and to correct a transmission characteristic; an interpolation process circuit 24; and an image signal output terminal 25.

Figure 1:
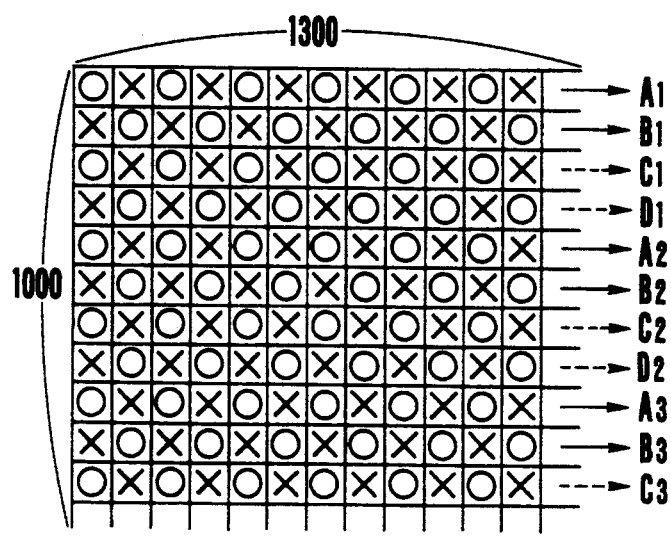
FIG. 1 shows the pattern of sampling made at the image sensor of a CHSV system.
Figure 2:
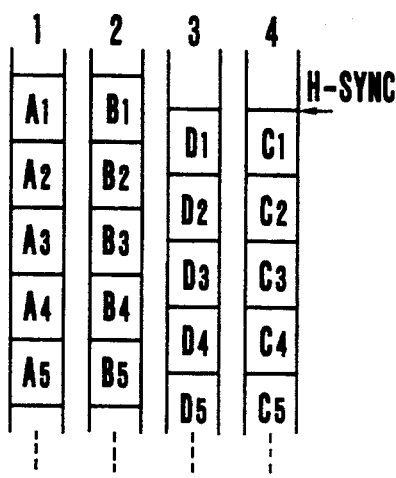
FIG. 2 shows a recording track pattern formed by the CHSV system.
Figure 3:
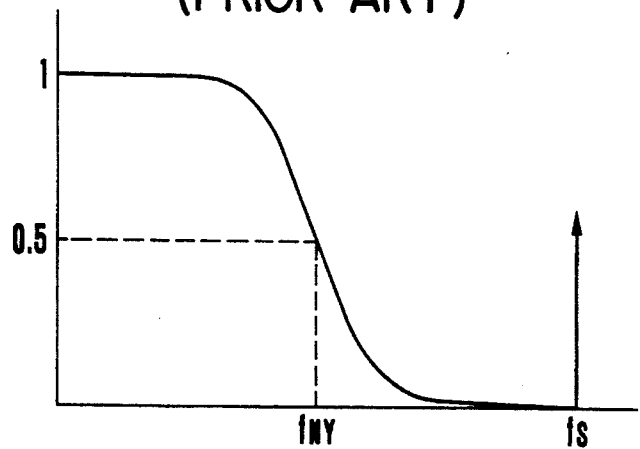
FIG. 3 shows an amplitude characteristic obtained by the CHSV system.
Figure 4:
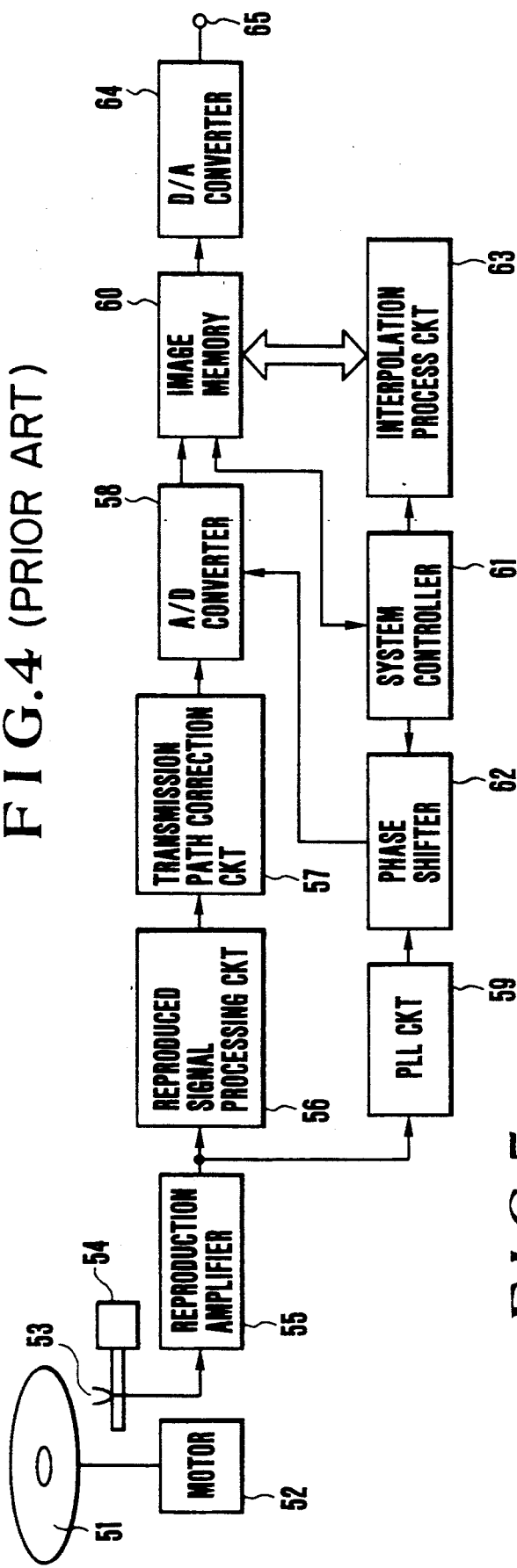
FIG. 4 is a block diagram showing in outline the arrangement of a reproducing apparatus included in the conventional CHSV system.
Figure 5:
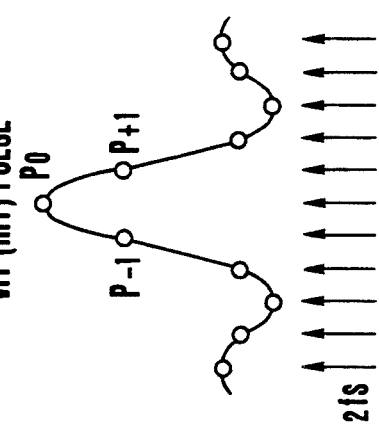
FIG. 5 shows the sampled positions of sampling data corresponding to a VIT pulse for explaining the operation of the reproducing apparatus of FIG. 4.
Figure 6:
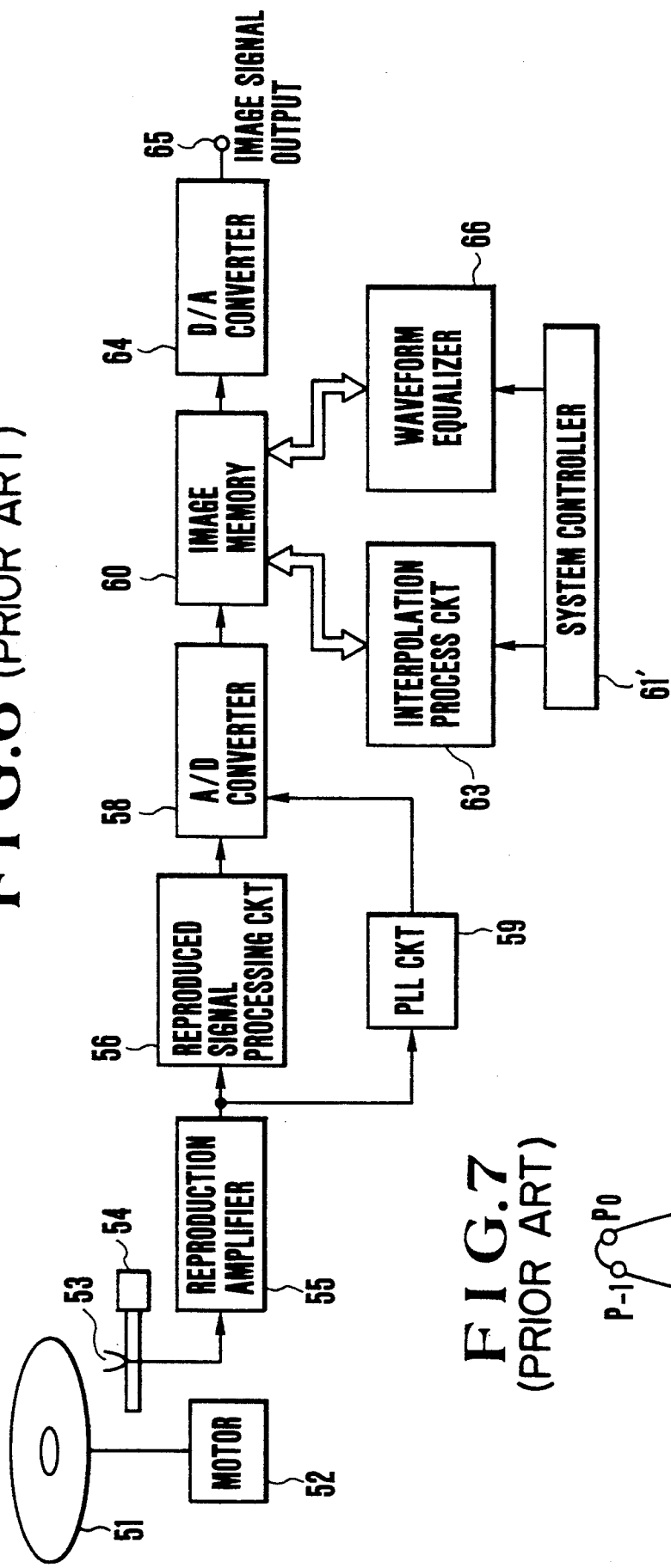
FIG. 6 is a block diagram showing in outline another example of arrangement of the reproducing apparatus of the conventional CHSV system.
Figure 7:
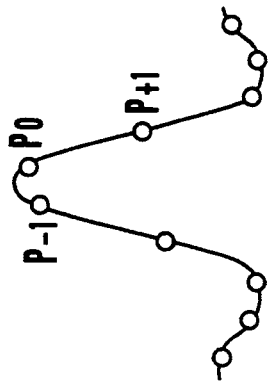
FIG. 7 shows the sampled position of sampling data corresponding to a VIT pulse for explaining the operation of the reproducing apparatus of FIG. 6.
Figure 9:
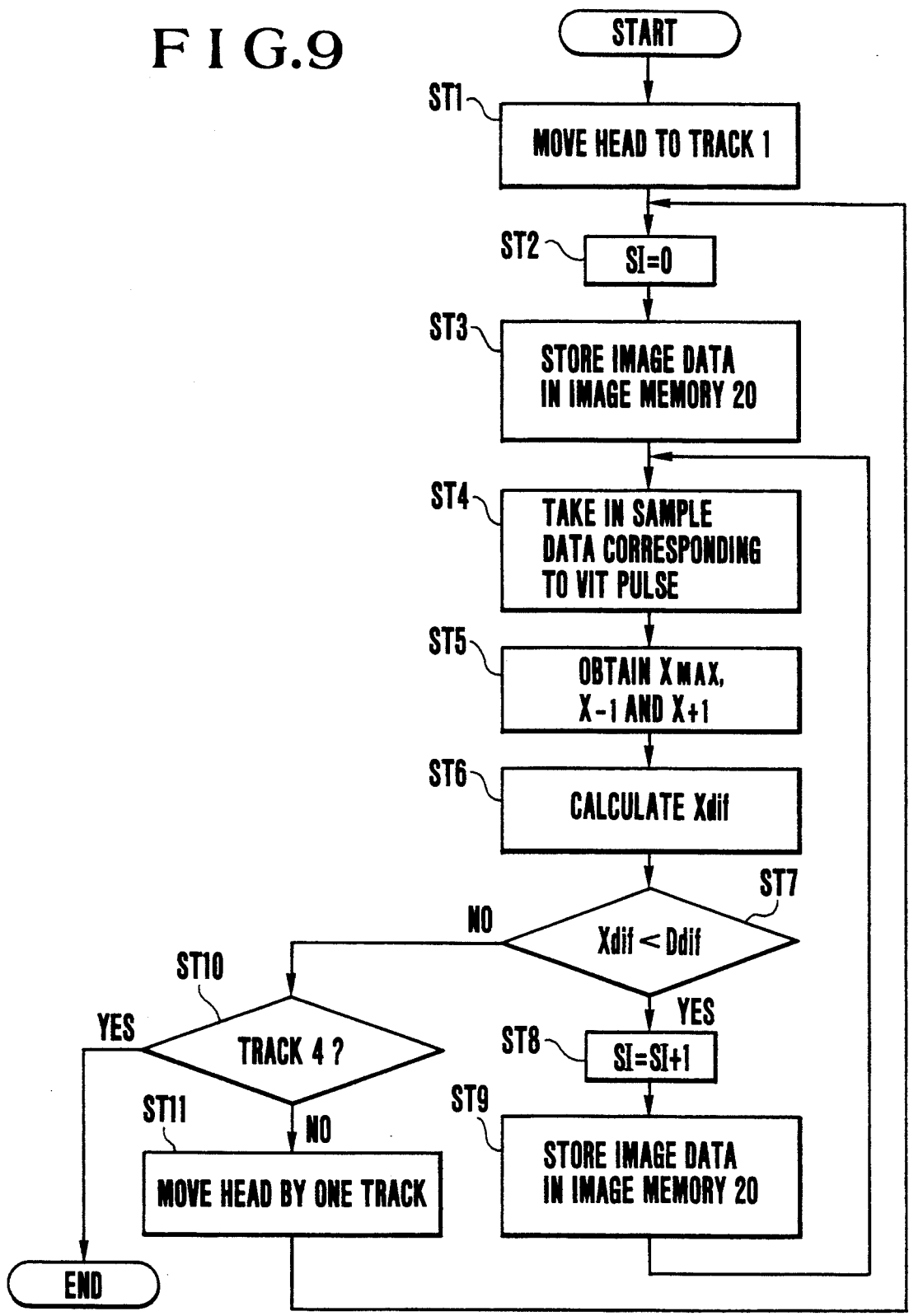
FIG. 9 is a flow chart showing the operation of the reproducing apparatus of FIG. 8.

Referring to FIG. 9 which is a flow chart, the operation of the reproducing apparatus shown in FIG. 8 is described as follows: when an operation part which is not shown is operated to give an instruction for a reproducing action, for example, on the record of the track 1 of the magnetic disc 11 shown in FIG. 2, the magnetic head 13 is moved by the head moving mechanism 14 to the track 1 on the magnetic disc 11, at a step ST1 of FIG. 9.

The magnetic head 13 then reproduces a signal from the track 1 of the magnetic disc 11. The reproduced signal is supplied to the reproduction amplifier 15 to be amplified to a suitable level. The amplified signal is supplied to the reproduced signal processing circuit 16 to be subjected to various processes including frequency demodulation, deemphasizing process, etc. As a result, the reproduced signal is outputted from the reproduced signal processing circuit 16 as an image signal. The image signal is supplied to the A/D converter 17.

Meanwhile, the reproduced signal amplified by the reproduction amplifier 15 is also supplied to the PLL circuit 18 to have a pilot signal for the TBC extracted from the reproduced signal. The PLL circuit 18 then generates the sampling clock signal 2fs which is phase-locked to the pilot signal for the TBC. The sampling clock signal 2fs generated by the PLL circuit 18 is supplied to the delay element group 19 and the switch "a".

Step ST2: The system controller 22 initializes a variable SI to a value "0" for controlling the on- and off-states of the group of switches "a" to "e". The variable SI is arranged to vary to "0", "1", "2", "3" and "4" one after another to serially turn on the group of the switches "a" to "e" every time the variable SI increases by one. Then, as mentioned in the foregoing, the amount of delay of the sampling clock signal 2fs changes to "0", "$\tau$", "$2\tau$", "$3\tau$" and "$4\tau$" one after another. Since the variable SI is initialized to "0" at the step ST2, the switch "a" alone turns on to allow the sampling clock signal 2fs to be supplied via the delay element group 19 to the A/D converter 17.

Figure 10:
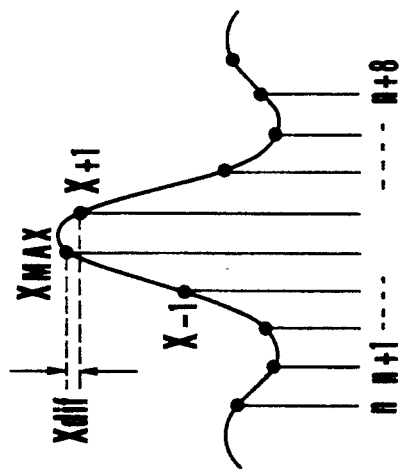
FIG. 10 shows the sampled position of sampling data corresponding to a VIT pulse for explaining a sampling phase correcting action of the reproducing apparatus of FIG. 8.

Step ST3: The A/D converter 17 digitizes the image signal outputted from the reproduced signal processing circuit 16 in synchronism with the sampling clock signal 2fs supplied from the PLL circuit 18 through the switch "a". Digital image data thus obtained is stored in the image memory 20. Step ST4: Of the data stored in the image memory 20, data which corresponds to the VIT pulse and consists of, for example, a total of nine sample data including data of addresses n to n+8 as shown in FIG. 10 is taken in the system controller 22.

Step ST5: With the nine sample data thus taken in from the image memory 20, the system controller 22 detects the data of maximum value $X_{MAX}$ with its address $N_{MAX}$, the data X−1 and X+1 of addresses N−1 and N+1 before and after the address $N_{MAX}$. Step ST6: The system controller 22 obtains differences between the data $X_{MAX}$ and X−1 and between the data $X_{MAX}$ and X+1, respectively. The system controller 22 then finds by computation the smaller (Xdif) of the two differences.

Step ST7: The minimum difference data Xdif thus computed at the step ST6 is compared with a preset value Ddif. If the minimum difference data Xdif is equal to or larger than the preset value Ddif, the flow of operation comes to a step ST10. If the data Xdif is smaller than the preset value Ddif, the flow comes to a step ST8. Step ST8: The system controller 22 turns on the switch "b" by incrementing the variable SI by one. The sampling clock signal 2fs generated by the PLL circuit 18 is delayed as much as a period of time "$\tau$" by the delay element group 19 before the sampling clock signal 2fs is supplied to the A/D converter 17.

Step ST9: Data at a sampling position delayed as much as the time "$\tau$" from the sampling position obtained at the step ST3 is stored in the image memory 20. After the step ST9, the flow comes back to the step ST4 to compute the minimum difference data Xif again at the steps ST4, ST5 and ST6, and the flow again comes to the step ST7 to repeat the above-stated processes until the minimum difference data Xdif becomes equal to or larger than the preset value Ddif.

Figure 11C:
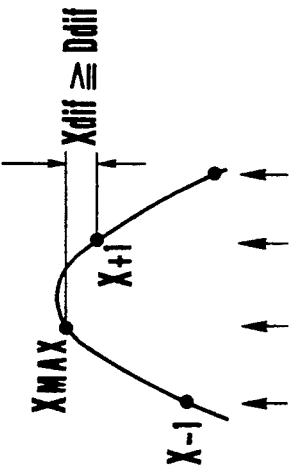
FIGS. 11(a), 11(b) and 11(c) show variations taking place in the sampled position of sampling data corresponding to a VIT pulse for explaining the sampling phase correcting action of the reproducing apparatus of FIG. 8.
Figure 11B:
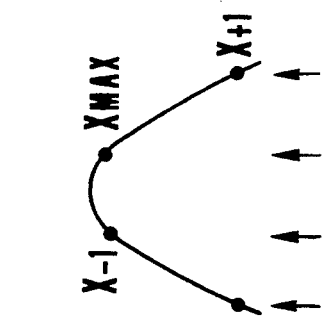
Figure 11A:
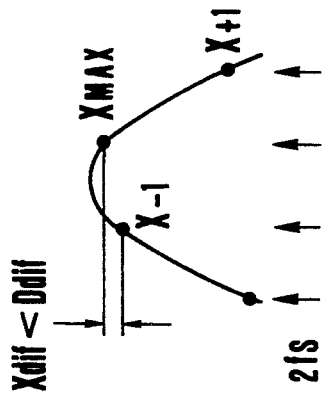

FIGS. 11(a), 11(b) and 11(c) show the variations of the sampling position obtained at the above-stated steps ST4 to ST9. Of these figures, FIG. 11(a) shows the sampling position first obtained. In this instance, the minimum difference data Xdif is smaller than the preset value Ddif. After that, as shown in FIGS. 11(b) and 11(c), the switch operation is changed from the switch "a" to each of the switches "b" to "e" one after another to further delay the sampling clock signal 2fs until the sampling position is shifted to the sampling position as shown in FIG. 11(c) where the minimum difference data Xdif becomes equal to or larger than the preset value Ddif.

In a case where the minimum difference data Xdif is found to be equal to or larger than the preset value Ddif at the step ST7, the flow comes to the step ST10, after the image signal reproduced from the track 1 of the magnetic disc 11 is completely stored, because the waveform equalizing process can be accurately accomplished by using the data sampled at the current sampling phase. Step ST10: A check is made to find if the track being currently traced by the magnetic head 13 is the track 4 shown in FIG. 2. If not, the flow comes to a step ST11. Step ST11: The head moving mechanism 14 moves the magnetic head 13 to an extent corresponding to one track. After that, the flow comes back to the step ST2 to repeat the execution of the above-stated steps until the track 4 comes to be detected at the step ST10. Upon detection of the track. 4, an image data storing action on the image memory 20 is completed.

As described above, the signal reproduced from the magnetic disc 11 is demodulated into an image signal and is then stored in the image memory 20. The image data stored in the image memory 20 is waveform-equalized by the waveform equalizer 23 which is composed of a digital filter. After that, the image data is again stored in the image memory 20. The interpolation process circuit 24 then performs an interpolation process. After completion of the interpolation process, the data stored in the image memory 20 is read out according to an accurate clock signal which is generated by a reading clock signal generator (not shown) and has no time base variations. The data thus read out from the image memory 20 is supplied to the D/A converter 21 to be converted into an analog signal. Through this operation, a high-definition image signal which is comparable with a high-vision signal is outputted from the output terminal 25.

Since the sampling phase is always set by the operation described above at a phase apposite to the waveform equalizing process, a high-definition image signal is obtainable with a stable picture quality by carrying out the waveform equalizing process.

In the embodiment described, the sampling phase is arranged to be adjusted by using the VIT pulse which is added at the time of recording. However, this arrangement may be changed to adjust the sampling phase by using a HIT pulse instead of the VIT pulse.

Further, in the case of the reproducing apparatus shown in FIG. 8, a delay element group consisting of four delay elements is employed. However, the number of the delay elements to be employed is not limited to four and may be set according to the preset threshold value Ddif or the amount of delay to be made by the delay elements.

In the case of a magnetic disc, S/N of the reproduced signal obtained on the radially inner side of the magnetic disc is inferior to that of the reproduced signal obtained on the radially outer side of the magnetic disc. In view of this fact, the threshold value Ddif is set at a larger value for reproduction from the radially inner tracks than for reproduction from the radially outer tracks. In reproducing the signal from the radially inner tracks, the sampling phase thus can be set at a phase which is close to an ideal sampling phase. Therefore, the image quality deterioration can be prevented when the signal is reproduced from the tracks located on the radially inner side of the magnetic disc.

As described in the foregoing, the embodiment is arranged to detect a difference between data indicating the largest value and a next largest value of the sampled data of a reproduced signal corresponding to the VIT or HIT pulse recorded in addition to the image signal at the time of recording; and to control the sampling phase of the VIT or HIT pulse by delaying the sampling clock signal 2fs according to the difference between the largest and next largest values. This arrangement enables the digital waveform equalizing process to be always accurately carried out even by a digital filter having a small number of taps, so that a high-definition image signal can be stably obtained.

As apparent from the foregoing description, an image information transmission system according to this invention is capable of accurately transmitting image information without being affected by any time base variations that take place on the transmission path in transmitting the image information.

What is claimed is:

1. An image information transmission system for transmitting image information, comprising:
   (A) conversion means arranged to receive a transmitted analog image signal, to convert the received analog image signal into digital image data in synchronism with a sampling clock signal and to output the digital image data;
   (B) storing means for inputting the digital image data outputted from said conversion means and storing the inputted digital image data; and
   (C) sampling clock signal delay means arranged to detect a difference value between data indicating a largest value and data indicating a second largest value among a plurality of data in a specific term of the image data, to compare the detected difference value with a given threshold value, to delay the sampling clock signal according to the result of comparison, and to supply the delayed sampling clock signal to said conversion means.

2. A system according to claim 1, wherein the analog image signal inputted to said conversion means includes a sampled-value analog-transmitted image signal which is sampled on the side of a transmission apparatus and is transmitted in an analog manner.

3. A system according to claim 1, wherein the analog image signal inputted to said conversion means is an image signal to which at least one reference pulse is added during a blanking period.

4. A system according to claim 3, wherein said sampling clock signal delay means is arranged to detect a value of difference between data indicating the largest value and data indicating the second largest value among the plurality of data in the specific term where a data corresponding to said reference pulse exists, of the digital image data outputted from said conversion means, to compare the detected difference value with a predetermined threshold value, to delay said sampling clock signal according to a result of comparison and to supply the delayed sampling clock signal to said conversion means.

5. A system according to claim 1, wherein the analog image signal inputted to said conversion means includes an analog image signal reproduced from a recording medium.

6. A system according to claim 1, further comprising interpolation means for forming digital interpolating image data corresponding to parts of the image signal not transmitted, by using the digital image data stored in said storing means, and for storing the digital interpolating image data in said storing means.

* * * * *

UNITED STATES PATENT AND TRADEMARK OFFICE
CERTIFICATE OF CORRECTION

PATENT NO. : 5,347,316

DATED : September 13, 1994

INVENTOR(S) : Tokihiko Ogura

It is certified that error appears in the above-identified patent and that said Letters Patent is hereby corrected as shown below:

On the title page,
   Item [30]. Insert -- [30] Foreign Application Priority Data
   Nov. 22 1990 [JP] Japan ...... HEI02-319496 --.

Col. 4, line 13.  Change "an" to -- a --.

Col. 8, line 40,  Change "with" to -- to --.

Signed and Sealed this

Seventeenth Day of January, 1995

BRUCE LEHMAN

*Attest:*

*Attesting Officer*          *Commissioner of Patents and Trademarks*